United States Patent
Kubota et al.

(10) Patent No.: US 6,410,656 B1
(45) Date of Patent: Jun. 25, 2002

(54) CATION EXCHANGERS OR CHELATING AGENTS AND PROCESS FOR THE PREPARATION THEREOF

(75) Inventors: Hirohisa Kubota; Katsuhiko Yano; Junya Watanabe, all of Yokohama; Akinori Jyo, Kumamoto, all of (JP)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/230,578

(22) PCT Filed: Jul. 29, 1997

(86) PCT No.: PCT/JP97/02623

§ 371 (c)(1), (2), (4) Date: Apr. 29, 1999

(87) PCT Pub. No.: WO98/04598

PCT Pub. Date: Feb. 5, 1998

(30) Foreign Application Priority Data

Jul. 31, 1996 (JP) .............................................. 8-219476
Jul. 31, 1996 (JP) .............................................. 8-219477

(51) Int. Cl.[7] .................................................. C08F 8/34
(52) U.S. Cl. ........................ 525/332.2; 521/31; 521/32; 521/33; 525/333.4; 525/343; 525/353; 525/359.1
(58) Field of Search ........................... 525/332.2, 333.4; 521/31, 33

(56) References Cited

U.S. PATENT DOCUMENTS 5,350,523 A    9/1994    Tomoi et al.

FOREIGN PATENT DOCUMENTS

| DE | 2454929 | 5/1975 |
|---|---|---|
| DE | 3903983 A | 8/1989 |
| EP | 0036584 | 9/1981 |
| EP | 0189672 | 8/1986 |
| EP | 0304377a | 2/1989 |
| EP | 0547720 A2 | 6/1993 |
| WO | WO 97/05175 | 2/1997 |

OTHER PUBLICATIONS

Doscher et al, Synthesis of Sulfoalkylated Styrene–Divinylbenzene Copolymers, 1297A Die Makromoleculare Chemie/Rapid Communications, vol. 1 No. 5, May 2, 1980.
Chem Abstracts, vol. 89, No. 24, Dec. 1978, Abst. No. 198505x, p. 39, col. 1.

*Primary Examiner*—Bernard Lipman
(74) *Attorney, Agent, or Firm*—William J. Sapone; Coleman, Sudol, Sapone, P.C.

(57) ABSTRACT

A cation exchanger or a chelating agent having at least structural units represented by the following formula (I), the structural units being derived from a crosslinkable monomer containing an unsaturated hydrocarbon group:

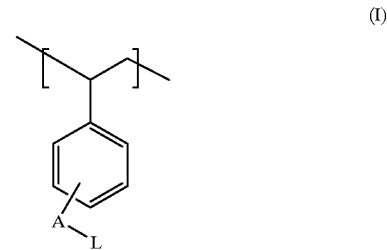

(I)

wherein A represents a $C_3$–$C_8$ alkylene group or a $C_4$–$C_9$ alkoxymethylene group; L represents $SO_3^-X^+$, where $X^+$ is a counter ion coordinated with the $SO_3^-$ group, or a chelate-forming functional group; and the benzene ring may be substituted with an alkyl group or a halogen atom.

5 Claims, No Drawings

CATION EXCHANGERS OR CHELATING AGENTS AND PROCESS FOR THE PREPARATION THEREOF

TECHNICAL FIELD

The present invention relates to a cation exchanger or chelating agent and a production process thereof. The cation exchanger of the present invention has a novel structure with excellent heat resistance and other features, and the chelating agent of the present invention has a novel structure with excellent chelate forming ability, heat resistance and other features.

BACKGROUND ART

Generally, cation exchange resins are produced by sulfonating styrene-divinylbenzene copolymers with sulfuric acid and/or sulfur trioxide of various concentrations in view of chemical stability of the produced resins, their strength and production cost. There are also known the cation exchange resins produced by introducing a sulfonic group to the terminal of acrylic derivative resins, but these cation exchange resins are poor in chemical stability.

As another exemplification of cation exchange resins, in U.S. Pat. No. 3,944,507 specification, there has been described a cation exchanger incorporated with methylene linkage (benzenesulfonic acid structure), but this cation exchanger is unsatisfactory in heat resistance. There has also been described a cation exchanger produced by introducing a halogen atom into the benzene ring for improving heat resistance, but this cation exchanger has not been commercially produced and used because of liability to ion leakage of its halides such as chlorinated or brominated products.

On the other hand, chelating agents (resins) are the functional resins produced by introducing functional groups capable of forming metal ions and chelates to the crosslinked polymers, and a variety of chelate resins have been proposed according to the type of the chelate-forming functional group used. Typical examples of the chelate-forming functional groups usable for the above purpose are iminodiacetic acid group ($-N(CH_2COO-)_2$) and polyamine group ($-NH(CH_2CH_2NH)n.H$). These chelate resins, for example, the said iminodiacetic acid type chelate resins are usually produced by converting the halogen of a crosslinked polymer containing halogenated methylstyrene into iminodiacetic acid group.

It appears, however, that most of the conventional proposals relating to chelate resins are directed to the improvement of chelate-forming functional groups and no sufficient proposals have been made on the structure between the crosslinked polymer and the chelate-forming functional group.

The present invention has been made in view of the above circumstances, and an object thereof is to provide a cation exchanger which has excellent heat resistance and high reaction rate, is capable of minimized elution from the polymer, and a process for producing such a cation exchanger. Another object of the present invention is to provide a chelating agent of a novel structure having excellent chelate forming ability and heat resistance, and a process for producing such a chelating agent.

DISCLOSURE OF THE INVENTION

An object of the present invention can be attained by a cation exchanger or a chelating agent having at least structural units represented by the following formula (I), the structural units being derived from a crosslinkable monomer containing an unsaturated hydrocarbon group:

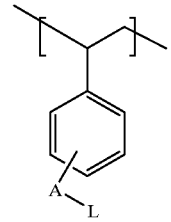

(I)

wherein A represents a $C_3$–$C_8$ alkylene group or a $C_4$–$C_9$ alkoxymethylene group; L represents $SO_3^-X^+$, where $X^+$ is a counter ion coordinated with the $SO_3^-$ group, or a chelate-forming functional group; and the benzene ring may be substituted with an alkyl group or a halogen atom.

Another object of the present invention can be accomplished by a process for producing a cation exchanger as defined in the above first aspect, which comprises suspension-polymerizing at least a precursor monomer having the structural units represented by the following formula (II) and a crosslinkable monomer having an unsaturated hydrocarbon group in the presence of a polymerization initiator, and if necessary introducing a cation exchange group into the obtained spherical crosslinked polymer:

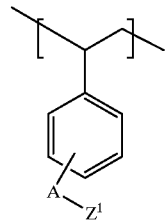

(II)

wherein A has the same meaning as defined in the formula (I); $Z^1$ represents chlorine, bromine, iodine, a hydroxyl group, a tosyl group (toluenesulfonic group), a thiol group or a sulfonic group; and the benzene ring may be substituted with an alkyl group or a halogen atom.

Still another object of the present invention can be achieved by a process for producing a chelating agent as defined in the above first aspect, which comprises suspension-polymerizing at least a precursor monomer having the structural units represented by the following formula (III) and a crosslinkable monomer having an unsaturated hydrocarbon group in the presence of a polymerization initiator, and introducing a chelate-forming functional group into the obtained spherical crosslinked polymer:

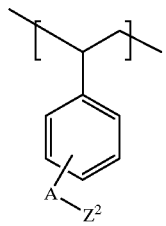

(III)

wherein A has the same meaning as defined in the formula (I); $Z^2$ represents chlorine, bromine; iodine or a hydroxyl group; and the benzene ring may be substituted with an alkyl group or a halogen atom.

The present invention is described in detail below.

First, the cation exchanger or chelating agent according to the present invention is explained.

The cation exchanger or chelating agent of the present invention has at least the structural units represented by the above-shown formula (I) and the structural units derived from a crosslinkable monomer having an unsaturated hydrocarbon group.

In case where L in the formula (I) is $SO_3^-X^+$ (wherein $X^+$ is a counter ion coordinated with the $SO_3^-$ group), a cation exchanger is provided; and in case where L is a chelate-forming functional group, a chelating agent is provided.

L representing a chelate-forming functional group is not specified, and any functional group used in the known chelate resins can be used without restrictions. Typical examples of L include iminodiacetate group (—N(CH$_2$COO—)$_2$), polyamine group (—NH(CH$_2$CH$_2$NH)$_n$.H), dimethylglycine (dimethylaminoacetate) group (—N$^+$(CH$_3$)$_2$CH$_2$COO—) and the like. As compared with, for example, aminomethylsulfonic group disclosed in Japanese Patent KOHYO (Laid-Open PCT Application) No. 4-500223, it is particularly remarkable that these chelate-forming functional groups, are relatively simple in structure, advantageous in cost and also susceptible to the influence of benzene ring because of relatively simple molecular structure, so that the effect by spacer (A) in the present invention, which is described later, is remarkable.

Besides the above-mentioned, there can also be used aminophosphoric group and phosphonic group as the chelate-forming functional group. The aminophosphoric type chelate resins can, for instance, be preferably used for purification of salt water contained in the raw materials of electrolytic sodium hydroxide and are capable of effectively removing the impurities such as calcium and strontium in the salt water. On the other hand, the phosphonic type chelate resins show high adsorptivity for many types of metal ions and have higher selectivity for tri- and tetravalent metal ions than for mono- and divalent metal ions. Because of these properties, the phosphonic chelate resins are advantageously used for selective removal of iron ions in zinc or nickel electroplating solutions and for separation and concentration of uranium and rare earth element ions.

In the formula (I), A represents an alkylene group having 3 to 8 carbon atoms or an alkoxymethylene group having 4 to 9 carbon atoms. Examples of the $C_3$–$C_8$ alkylene groups include propylene, butylene, pentylene, hexylene and octylene, and examples of the $C_4$–$C_9$ alkoxymethylene groups include butoxymethylene and pentoxymethylene. The $C_3$–$C_8$ alkylene groups may be either straight-chain alkylene groups such as mentioned above or branched alkylene groups such as isopropyl and t-butyl groups. When A is an alkylene group, it is preferably a straight-chain alkylene group having 3 to 8 carbon atoms, more preferably the one having 3 to 6 carbon atoms. When A is an alkoxymethylene group, it is preferably the one having 5 to 7 carbon atoms.

Japanese Patent KOHYO (Laid-Open PCT Application) No. 4-500223 has proposed a process for producing aminomethylphosphonic chelate resins by introducing a functional group represented by the formula —(CHR$^1$)m—NR$^2$—CH$_2$—PO$_3$R$^3$R$^4$ (wherein R$^1$ includes hydrogen and m is a number of 1 to 12) into a crosslinked polymer. However, the chelate resins described concretely in the above patent, for example, the chelate resins mentioned in all of the Examples 1–27 are the ones obtainable by introducing an aminomethylphosphonic group into a chloromethylated crosslinked polymer which is a compound of the formula (I) wherein m is 1.

In the present invention, when A does not satisfy the above definition, there are the following problems for both of cation exchanger and chelating agent.

When A is a Short-Chain Group Like Methylene or Ethylene (1) Cation exchange group ($SO_3^-$ group) is subject to the influence of benzene ring through the short chain, and consequently no satisfactory heat resistance may be obtained and also acidity lowers. Reduction of acidity can well be anticipated from the fact that alkylsulfonic acid has higher acidity than benzenesulfonic acid and also aliphatic carboxylic acids have higher acidity than benzoic acid.

(2) The chelate-forming functional group may not fully show its chelate forming ability because its free movement is restricted. Also, as the chelate-forming functional group is subject to the influence of benzene ring through the short chain, no satisfactory heat resistance may be obtained.

When A is a Long-Chain Group Like Nonylene (1) Molecular weight of the cation exchanger is enlarged, so that the ion exchange capacity per unit weight may be reduced.

(2) Long chain is advantageous from the viewpoint of improvement of chelate forming ability, but the molecular weight of chelate resin is enlarged, so that the chelate forming ability per unit weight may be reduced.

In the present invention, it is preferable for production of the objective substance that A is introduced to the m- or p-position of the styrene residue. Although little influence is expected to be given to the steric relation between benzene ring and substituent group (L being $SO_3^-$ group or chelate-forming functional group) even when A is introduced to the opposition, it is preferable to introduce A to the m- or p-position in consideration of possible steric hindrance in copolymerization with a crosslinking agent.

The alkyl groups which may substitute the benzene ring include methyl and ethyl, and the substituent halogen atoms include fluorine, chlorine, bromine and iodine.

Examples of the crosslinkable monomers having unsaturated hydrocarbon groups include divinylbenzene, polyvinylbenzene, alkyldivinylbenzene, dialkyldivinylbenzene, ethylene glycol (poly)(meth)acrylate, polyethylene glycol di(meth)acrylate, (poly)ethylenebis(meth)acrylamide, and the like of these monomers, divinylbenzene is preferred.

In the cation exchanger or chelating agent of the present invention, the percentages of the structural units represented by the formula (I) and the structural units derived from a crosslinkable monomer having an unsaturated hydrocarbon group are not specifically defined. It is notable, however, that a too small ratio of the structural units represented by the formula (I) leads to a reduction of ion exchange capacity or chelating ability (exchange capacity) per unit weight, while a too small percentage of the structural units derived from a crosslinkable monomer having an unsaturated hydrocarbon group results in a high swelling tendency to cause a decrease of ion exchange capacity or chelating ability (exchange capacity) per unit weight. Therefore, the percentages of the respective structural units should be properly selected by taking into account ion exchange capacity, chelating ability (exchange capacity), swelling tendency, strength and other factors.

It is, however, preferable that the percentage of the structural units (precursor monomer) represented by the formula (I) in the whole structural units (whole precursor monomers) constituting the cation exchanger or chelating agent is usually 5 to 99 mol %, preferably 50 to 99 mol %, and the percentage of the structural units (precursor monomer) derived from a crosslinkable monomer having an unsaturated hydrocarbon group is usually 0.1 to 50 mol %, preferably 0.2 to 25 mol %.

The neutral salt decomposition capacity per unit weight of the cation exchanger of the present invention is usually 1.0 to 6.0 meq/g, preferably 1.0 to 5.5 meq/g, and its ion exchange capacity per unit weight, although variable depending on the water content, is usually 0.1 to 2.1 meq/ml. Here, the symbol "meq/g" denotes milliequivalent per unit weight of dry resin, the symbol "meq/ml" denotes milliequivalent per unit volume of hydrous resin.

The exchange capacity per unit weight of the chelate resin of the present invention is usually 1.0 to 6.0 meq/g, preferably 1.0 to 5.5 meq/g, and its exchange capacity per unit volume, although variable depending on water content, is usually 0.1 to 2.1 meq/g. Here, the symbol "meq/g" denotes milliequivalent per unit weight of dry resin, and the symbol "meq/ml" denotes milliequivalent per unit volume of hydrous resin.

Next, a process for producing the cation exchanger according to the present invention is described.

The cation exchanger of the present invention can be produced by suspension polymerizing at least a precursor monomer having the structural units represented by the formula (II) and a crosslinkable monomer having an unsaturated hydrocarbon group in the presence of a polymerization initiator, and if necessary introducing a cation exchange group into the obtained spherical crosslinked polymer.

The structural unit represented by the formula (II) is a precursor of the structural unit represented by the formula (I) (where L is $SO_3^-X^+$). In the formula (II), A has the same meaning as defined in the formula (I), $Z^1$ represents chlorine, bromine, iodine, a hydroxyl group, a tosyl group (toluenesulfonic group), a thiol group or a sulfonic group, and the benzene ring may be substituted with an alkyl group or a halogen atom. Introduction of a cation exchange group is required in case where $Z^1$ is a substituent group other than sulfonic group.

The precursor monomers of the structural units represented by the formula (II) where A is an alkylene group (alkyl spacer type monomers) can be synthesized, for example, in the following way: a halogenated styrene (such as chlorostyrene or bromostyrene), a chloromethylstyrene (which may be a mixture of m-form and p-form) or a vinylphenetyl halide is reacted with a metallic magnesium to obtain a Grignard reagent and the latter is coupled with 1, ω-dihalogenoalkane.

In the coupling reaction, a catalyst such as a copper halide (copper chloride, copper bromide or copper iodide), $Li_2CuCl_4$ or an amine may be used to carry out the reaction efficiently. An alkyl spacer type monomer can also be synthesized by a method in which a ω-halogenoalkylbenzene derivative is acetylated and then a vinyl group is introduced.

The precursor monomers of the structural units represented by the formula (II) where A is an alkoxymethylene group (ether spacer type monomers) can be synthesized, for example, in the following way: a vinylbenzyl alcohol is reacted with 1, ω-dihalogenoalkane to convert into a halogenoalkoxymethylstyrene derivative.

Suspension polymerization is carried out with a suspension containing a precursor monomer of the structural units represented by the formula (II) and a crosslinkable monomer having an unsaturated hydrocarbon group. In this case, if necessary a third monomer may be used as a copolymerization component within limits not lowering the function of the produced cation exchanger of the present invention.

As the copolymerization component, there can be used, for example, styrene, alkylstyrene, polyalkylstyrene, (meth) acrylic ester, (meth)acrylic acid, acrylonitrile and the like, in an amount of usually not more than 50 mol %, preferably not more than 20 mol %, based on the total amount of the essential monomers. The byproducts in the synthesis of the precursor monomers of the structural units represented by the formula (II), such as bisvinylphenylethane, bisvinybenzylether and bisvinylphenylbutane, can also be used as crosslinking agent.

A known water-in-oil type or oil-in-water type suspension polymerization method can be employed for the suspension polymerization in the present invention. In this suspension polymerization, the bath ratio of water to oil or oil to water is preferably adjusted to fall in the range from 1:2 to 1:6. As the polymerization initiator, there can be used any pertinent type of polymerization initiators such as peroxide type and azo type, specifically such peroxide type polymerization initiators as benzoyl peroxide (BPO), lauroyl peroxide and t-butyl hydroperoxide, and such azo type polymerization initiators as azoisobutylnitrile (AIBN) and 2,2'-azobis(2,4-dimethylvaleronitrile).

The amount of the polymerization initiator used for the reaction is usually 0.1 to 3 wt % based on the overall amount of the monomers. Polymerization temperature depends on half-value period temperature and content of the polymerization initiator used, polymerizability of the monomers and other factors, but is usually 40 to 150° C., preferably 50 to 100° C. Polymerization time is usually one to 30 hours, preferably one to 15 hours.

In the suspension polymerization, various types of solvent may be added as required. The physical structure of the obtained crosslinked copolymer particles differs depending on the kind and amount of the solvent used, so that it is possible to obtain the preferred type, such as gel type or porous type, of crosslinked copolymer particles by controlling the solvent used.

For instance, in case where suspension polymerization is carried out by adding an organic solvent such as toluene, hexane, isooctane, 2-ethylhexanol or the like which is a poor solvent for the precursor monomers of the structural units represented by the formula (II), there can be obtained the crosslinked copolymer particles of a porous structure although the product is variable depending on the monomer content in the suspension polymerization system. On the other hand, in case where a good solvent such as tetrahydrofuran, 1,4-dioxane or the like is used, there can be obtained the crosslinked copolymer particles with a swelling tendency. It is also possible to add other types of solvent such as water, methanol, ethanol, acetone or the like. The amount of such a solvent added is usually not more than 200 wt % based on the total amount of the monomers.

The size of the obtained crosslinked polymer particles may differ in a manner according to the purpose of use of the cation exchanger. In case where it is used as an ion exchange resin, the average particle size is usually 50 μm to 2 mm, and in case where it is used as a resin for catalysts, the average particle size is usually 20 μm to 1 mm.

In the production process of the present invention, in case where $Z^1$ in the formula (II) is a substituent group other than sulfonic group, a cation exchange group (sulfonic group in the formula (II)) is introduced by a known method (sulfonation reaction). Such sulfonation reaction can be effected, for example, by the following methods when $Z^1$ is a halogen atom:

(1) The polymerization product is reacted with thiourea to obtain an isothiouronium salt and then the product is oxidized with hydrogen peroxide or the like to convert the substituent into sulfonic group.

(2) The polymerization product is reacted with $EtOCS_2K$ to obtain a dithiocarbonic acid-O-ethyl ester and then the product is oxidized to convert the substituent into sulfonic group.

(3) The polymerization product is reacted with $CH_3COSH$ to obtain an acetic thioester and then the product is oxidized to covert the substituent into sulfonic group.

(4) In case where $Z^1$ for introducing a sulfonic group through reaction with sodium sulfite is a thiol group, the polymerization product may be oxidized to convert the substituent into sulfonic group.

In the above reaction, usually a solvent is added to the reaction system for swelling the crosslinked polymer particles. As the solvent, there can be used, for example, water, alcohols such as methanol, ethanol and propanol, hydrocarbons such as toluene and hexane, chlorine type hydrocarbons such as dichloromethane and 1,2-dichloroethane, ethers such as dibutyl ether, dioxane and tetrahydrofuran, and others such as dimethylformamide and acetonitrile. Reaction temperature depends on the mode of reaction, the kind of the functional group and solvent used and other factors, but is usually 20 to 130° C.

The cation exchanger of the present invention is obtained in spherical form because of use of suspension polymerization described above, but the product may be pulverized into powders. It is also possible to obtain the product in various other forms such as lumpy, fibrous, filmy, etc., by using solution polymerization.

Besides the above-described monomer method, the cation exchanger of the present invention can also be produced by a method in which a chloromethylated crosslinked copolymer is used as starting material and the substituent group A is introduced by polymeric modification method. More specifically, a method can be used in which a reagent such as n-BuLi is acted to a chloromethylated crosslinked polystyrene to produce the vinylbenzyl anions and the said anion are reacted with 1, ω-dihalogenoalkane to obtain an alkyl spacer type crosslinked copolymer. According to the same method as described in the above, the introduction of sulfonic group can be conducted. However, the above-described monomer method is preferred because of higher ion exchange capacity of the obtained cation exchanger.

Now, a process for producing the chelating agent according to the present invention is explained. The chelating agent of the present invention can be produced by suspension polymerizing a precursor monomer comprising the structural units represented by the formula (III) and a crosslinkable monomer having an unsaturated hydrocarbon group in the presence of a polymerization initiator, and introducing a chelate-forming functional group into the obtained spherical crosslinked polymer. The precursor monomer of the structural units represented by the formula (III) is a precursor of the monomer of the structural units represented by the formula (I) (where L is a chelate-forming functional group). In the formula (III), A has the same meaning as defined in the formula (I), $Z^2$ represents chlorine, bromine, iodine or a hydroxyl group, and the benzene ring may be substituted with an alkyl group or a halogen atom.

In the process for producing the chelating agent, there are used the same monomer method and polymeric modification method as explained in the above-described process for producing the cation exchanger, and the same conditions can be used except for introduction of a chelate-forming functional group in place of a cation exchange group. That is, in the monomer method, the operations till suspension polymerization can be conducted in the completely same way as in the above-described process for producing the cation exchanger to obtain the crosslinked polymer particles. In this case, the average size of the crosslinked polymer particles is usually in the range of 50 μm to 2 mm.

Introduction of the chelate-forming functional group into the spherical crosslinked polymer can be accomplished according to a conventional method. For instance, in case where $Z^2$ is a halogen atom, a dimethylglycine type chelate resin can be obtained by reacting a dimethylglycine ester and hydrolyzing the reaction product. Similarly, an iminodiacetate type chelate resin can be obtained by reacting an iminodiacetic ester and hydrolyzing the reaction product. In case where $Z^2$ is a hydroxyl group, it is also possible to introduce various kinds of chelate-forming functional group into the spherical crosslinked polymer according to a known reaction scheme.

In the above reaction, usually a solvent is added to the reaction system for bloating the crosslinked polymer particles. As the solvent, there can be used those used in the sulfonation reaction described above. Reaction temperature is variable depending on the mode of reaction, the kind of the functional group and solvent used and other factors, but it is usually 20 to 130° C.

Introduction of a chelate-forming functional group can be accomplished in the same way as in case where the polymeric modification method is used. The monomer method is preferred to the polymeric modification method as in the case of the cation exchanger.

The chelating agent of the present invention is obtained as a spherical product when using suspension polymerization as in the above-described embodiment, but it may be pulverized into powders. It is also possible to obtain the agent in various other forms, such as lumpy, fibrous, filmy, etc., by using solution polymerization.

According to the present invention, as described above, there is provided a cation exchanger or a chelating agent of a novel structure.

The cation exchanger of the present invention finds a wide range of use. The common uses thereof are, for instance, general-purpose water treatments (softening of hard water, production of pure water, recovery and separation of metals, purification of amino-acids, etc.), separation and purification of saccharic solutions, purification of pharmaceuticals, adsorption removal of colloidal substances such as iron, dehydration, and separation and purification of weakly acidic substances. Among other uses is preparation of various types of adsorbents, such as those for chromatographic carriers, film materials, catalyst carriers, phase-transfer catalysts, enzymes, cells, bacterial cell immobilization carriers, etc. It is especially remarkable that thanks to its excellent heat resistance, the cation exchanger of the present invention is particularly advantageous for use at high temperatures, for instance, in use as a catalyst.

Further, the cation exchanger of the present invention, as apparent from the Examples described below, has the advantage of being minimized in elution from resins, which is a defect of the conventional cation exchangers, and hence almost free of offensive smell.

On the other hand, the chelating agent of the present invention is capable of capturing a wide variety of metallic ions by proper selection of the chelate-forming functional group.

Furthermore, the chelating agent of the present invention has excellent chelate forming ability and heat resistance as well as the advantage of being minimized in elution from resins and hence almost free of offensive smell.

BEST MODE FOR CARRYING OUT THE INVENTION

The present invention is hereinafter described more particularly by showing the examples thereof, which examples however are merely intended to be illustrative and not to be construed as limiting the scope of the invention.

EXAMPLE 1

Cation Exchanger

Synthesis of 4-Bromobutylstyrene 44 g of metallic Mg and 360 g of tetrahydrofuran (THF) were supplied into a one-litre flask equipped with a nitrogen gas introducing tube, a Dimroth condenser, a ramified isotactic dropping funnel and a stirrer, and the internal temperature was set at 36° C. Then 350 ml of a THF solution of 251 g of p-chlorostyrene was added dropwise to the flask over a period of 2 hours under the conditions that the internal temperature doe not become higher than 40° C., to prepare a Grignard solution of p-chlorostyrene. Meanwhile, a mixed solution of 1,060 g of 1,4-dibromoethane, 400 ml of THF and 7.5 g of $Li_2CuCl_4$ was prepared.

The said Grignard solution was added dropwise to the said dibromoethane solution over a period of 2 hours under the conditions that the internal temperature does not become higher than 40° C. After the dropwise addition, the mixed solution was stirred for 2 hours to complete the reaction. The reaction solution was poured into water and then the liquid phase was separated. The organic phase was taken out and THF was distilled away under reduced pressure. The residue was subjected to vacuum distillation to recover the objective substance 4-bromobutylstyrene (a slightly yellowish transparent liquid having a boiling point of 130° C./0.5 mmHg).

Synthesis of 4-Bromobutylstyrene Crosslinked Copolymer 200 ml of desalted water and 50 ml of a 2 wt % polyvinyl alcohol solution were added to a 500 ml flask equipped with a nitrogen gas introducing tube, a stirrer and a condenser, and nitrogen was introduced into the mixed solution to remove oxygen present therein. Meanwhile, 48.0 g of 4-bromobutylstyrene, 1.08 g of divinylbenzene (with purity of 100 wt %) and 0.4 g of AIBN were mixed and dissolved to prepare a monomer solution and oxygen existing therein was removed in the same way as described above.

This monomer solution was put into the said flask and stirred at 150 rpm to prepare a suspension. The suspension was stirred at room temperature for 30 minutes, then heated to 70° C. and further stirred for 18 hours to effectuate suspension polymerization to obtain a light-yellow transparent spherical polymer. The produced polymer was taken out, washed with water and further cleaned thrice with methanol. The polymerization yield was 93 wt % and the initial degree of crosslinking of the polymer was 4 mol %.

Sulfonation of 4-Bromobutylstyrene Crosslinked Copolymer 25 g of the said polymer was supplied into a 500 ml flask equipped with a stirrer and a condenser, and 150 ml of ethanol was added thereto and stirred at room temperature. Then 22 g of thiourea was added to carry out the reaction at 70° C. for 8 hours. After the reaction, the reaction product was taken out and washed with water, and then 100 ml of a 30 wt % hydrogen peroxide solution was added thereto, carrying out the reaction under stirring at 50° C. for 6 hours to obtain a cation exchange resin. The results of determination of the general capabilities of this cation exchange resin were as shown in Table 1.

TABLE 1

| Salt-splitting capacity | 3.38 meq/g |
|---|---|
| Salt-splitting capacity | 1.35 meq/ml |
| Water content | 51.2 wt % |

EXAMPLE 2

Cation Exchanger

Synthesis of 4-Bromobutoxymethylstyrene 20 g (0.5 mol) of sodium hydroxide and 20 ml of water were added to a 300 ml flask equipped with a stirrer and a condenser, and stirred to form a homogeneous solution. The solution temperature was returned to room temperature.

13.42 g (0.1 mol) of hydroxymethylstyrene (a mixture of m-form and p-form), 32.39 g (0.15 mol) of 1,4-dibromobutane and 3.22 g (0.01 mol) of tetrabutylammonium bromide were dissolved in 100 ml of toluene and supplied into the said flask, and the mixed solution in the flask was stirred and reacted at 40° C. for 6 hours.

After the reaction, the organic phase was separated and washed with water. This organic phase was dried over magnesium sulfate and toluene was distilled away under reduced pressure. The resulting solution was subjected to vacuum distillation in the presence of diphenylpicryl-2-hydrazyl (DPPH) to obtain a colorless transparent solution (b.p. 112–117° C./0.6 mmHg). The structure of this solution was confirmed by NMR analysis. The yield of 4-bromobutoxymethylstyrene was 15.0 g (56 wt %).

Synthesis of 4-Bromobutoxymethylstyrene Crosslinked Copolymer

The same procedure as defined in Example 1 was conducted except for use of the said 4-bromobutoxymethylstyrene to obtain a 4-bromobutoxymethylstyrene crosslinked copolymer.

Sulfonation of 4-Bromobutoxymethylstyrene Crosslinked Copolymer

The same procedure as defined in Example 1 was conducted except that the said 4-bromobutoxymethylstyrene crosslinked copolymer was used, that 27 g of $EtOS_2K$ was used in place of thiourea, and that a dithiocarbonic acid O-ethyl ester was yielded as the intermediate product, to obtain a cation exchange resin. The results of determination of the general capabilities of this cation exchange resin were as shown in Table 2.

TABLE 2

| Salt-splitting capacity | 3.18 meq/g |
|---|---|
| Salt-splitting capacity | 1.10 meq/ml |
| Water content | 52.7 wt % |

Heat Resistance Test of Cation Exchange Resin

Over the cation exchange resin obtained in Example 1 was passed 10 times as much amount of a 4 wt % sodium chloride solution as the said resin to turn the counter ions into Na form, and a prescribed amount of the resin was weighed out. Then 500 ml of a 2N hydrochloric acid solution was passed over this resin to regenerate the H form, and the volume of the resin was measured. This regenerated form of resin was put into a glass-made autoclave, to which 0.8 times as much volume of desalted water as the H-form resin was added. In order to remove oxygen present in the solution in the container, nitrogen gas was passed through the solution in a 50° C. heated condition for 60 minutes. Then the autoclave was immersed in an oil bath and left at 150° C. for 30 days. Thereafter, for the sake of confirmation, the resin was regenerated to H type with 500 ml of a 2N hydrochloric acid solution and the volume of the resin was measured. Further, a 4 wt % sodium chloride solution of an amount 5 times the resin was passed over the resin to convert the counter ions $X^-$ into Na form.

Retention (wt %) of alkylene chain A in the resin was determined by the calculation formula shown below. Symbol A in the calculation formula designates salt-splitting capacity (meq/ml) and symbol B indicates the volume (ml) of the H-form resin. The results are shown in Table 3. The "comparative resin" in Table 3 is a commercial cation exchange resin "Diaion SK-1B" (registered trade name) available from Mitsubishi Chemical Corporation.

Retention (wt %)=[(A after test×B after test)÷(A before test×B before test)]×100

TABLE 3

|  | Example 1 resin | Resin of Comparative |
| --- | --- | --- |
| Volumetric change of resin | 70.2→68.9 | 70.7→66.5 |
| Change of salt-splitting capacity | 1.35→1.28 | 2.03→1.76 |
| Retention (wt %) | 93 | 82 |

EXAMPLE 3

Dimethylglycine Type Chelate Resin

Introduction of Chelate-forming Functional Group into Crosslinked Copolymer 10 g of a polymer (4-bromobutylstyrene crosslinked copolymer) obtained in the same way as in Example 1 was supplied into a 300 ml flask equipped with a stirrer and a condenser, then 40 ml of 1,4-dioxane was added and the solution was stirred at room temperature for 30 minutes. Thereafter, 20 ml of dimethylglycine ethyl ester was added to carry out esterification reaction under stirring at 70° C. for 6 hours. The reaction solution was passed through a glass filter and transferred into another flask equipped with a stirrer and a condenser, to which 150 ml of a 2N NaOH solution was added for reacting at 50° C. for 3 hours to effectuate hydrolysis of the ester to obtain a dimethylglycine type chelate resin. The obtained chelate resin was taken out and washed with water, and its general capabilities were determined. The results showed that the exchange capacity of the resin was 0.87 meq/ml (2.39 meq/g) and the water content was 48.4 wt %.

EXAMPLE 4

Dimethylglycine Type Chelate Resin

Synthesis of 4-Bromopropylstyrene Crosslinked Polymer

The same procedure as defined in Example 1 was conducted except that 687 g (4.39 mol) of 1,3-dibromopropane was used in place of 1,4-dibromobutane to obtain 4-bromopropylstyrene (a light-yellow transparent solution, b.p. 118° C./0.2 mmHg). This 4-bromopropylstyrene was further treated in the same way as in Example 1 to obtain a light-yellow transparent spherical polymer with an initial degree of crosslinking of 5 mol %.

Introduction of Chelate-forming Functional Group into Crosslinked Copolymer

The same procedure as defined in Example 3 was conducted except for use of the polymer obtained from the above synthesis to obtain a dimethylglycine type chelate resin. The exchange capacity of the obtained chelate resin was 0.96 meq/ml (2.75 meq/g) and its water content was 49.2 wt %.

EXAMPLE 5

Dimethylalycine Type Chelate Resin

Introduction of Chelate-forming Functional Group into Crosslinked Copolymer

The same procedure as defined in Example 3 was conducted except for use of the polymer (4-bromobutoxymethylstyrene crosslinked copolymer) obtained in the same way as in Example 2 to obtain a dimethylglycine type chelate resin. The exchange capacity of the obtained chelate resin was 0.74 meq/ml (2.21 meq/g) and its water content was 55.3 wt %.

EXAMPLE 6

Iminodiacetate Type Chelate Resin

Introduction of Chelate-forming Functional Group into Crosslinked Copolymer 10 g of a 4-bromopropylstyrene crosslinked copolymer obtained in the same way as in Example 4 was supplied into a 300 ml flask equipped with a stirrer and a condenser, and 50 ml of 1,4-dioxane was added thereto and stirred at room temperature for 30 minutes. Then 30 g of an iminodiacetic ester was added to carry out the esterification reaction under stirring at 80° C. for 3 hours. The reaction solution was passed through a glass filter and transferred into another flask equipped with a stirrer and a condenser, and 150 ml of a 2N NaOH solution was added for reacting at 70° C. for 5 hours to effectuate hydrolysis of the ester to obtain an iminodiacetate type chelate resin. The obtained chelate resin was taken out and washed with water, and its general capabilities were determined. The result showed that the exchange capacity of the resin was 0.87 meq/ml (2.39 meq/g) and its water content was 48.4 wt %.

EXAMPLE 7

Aminophoshoric Acid Type Chelate Resin

Introduction of Chelate-forming Functional Group into Crosslinked Copolymer 100 g of a polymer (4-bromobutylstyrene crosslinked copolymer) obtained in the same way as in Example 1, 300 ml of toluene and 120 g of ethylenediamine were supplied into a one-litre flask equipped with a stirrer and a condenser, and the mixed solution was heated to 70° C. to carry out the amination reaction for 6 hours to obtain an aminoethylaminobutyl group-terminated crosslinked copolymer. After the completion of the reaction, the reaction product was cooled down to normal temperature and the aminated crosslinked copolymer was filtered out and washed with methanol, after which toluene was removed.

Then 100 g of the hydro-extracted aminated crosslinked copolymer, 40 ml of concentrated sulfuric acid, 35 ml of a 37 wt % formaldehyde solution, 46 g of phosphorous acid and 30 ml of desalted water were supplied into another flask equipped with a stirrer and a condenser, and the mixed solution was heated to 100° C. to carry out the phosphoration reaction for 5 hours to obtain an aminophosphoric acid type chelate resin. The obtained resin was washed with desalted water and its calcium exchange capacity was determined.

Determination of Calcium Exchange Capacity

A 200 mM trishydrochloric buffer solution (pH 8.0) of 50 mM calcium chloride was prepared in a 300 ml Erlenmeyer flask. Meanwhile, the aminophosphoric acid type chelate resin was immersed in a 2N NaOH solution and washed with desalted water, and 5.0 ml of the solution was collected accurately. Then the dehydo-extracted resin was put into the buffer solution, and after 20-hour shaking at room temperature, 5 ml of the supernatant solution was collected and titrated with 10 mM disodium ethylenediaminetetraacetate. Calcium exchange capacity was determined from the residual amount of calcium. Calcium exchange capacity of the aminated crosslinked copolymer was 1.17 meq/ml-resin.

EXAMPLE 8

Phosphonic Acid Type Chelate Resin

Synthesis of 4-Chlorobutylstyrene 134 g of metallic Mg was put into a 3-litre flask equipped with a nitrogen gas introducing tube, a Dimroth condenser, a ramified isostatic dropping funnel and a stirrer, and the internal temperature was set at 31° C. Then a solution of 554 g of chlorostyrene, 739 g of THF and 1,133 g of toluene was added dropwise over a period of 2 hours to obtain a Grignard reagent of chlorostyrene.

Meanwhile, 12 g of cupric chloride, 150 g of THF and 1,345 g of 4-bromo-1-chlorobutane were supplied into a separately prepared reaction vessel, and the internal temperature was set at 25° C.

Then the said Grignard reagent was added dropwise into the said reaction vessel over a period of 3 hours under the conditions that the internal temperature would become 30° C. After the end of the dropwise addition, the solution was stirred at 30° C. for 3 hours to complete the reaction. The reaction solution was poured into water and the liquid phase was separated. The organic phase was taken out, and THF, toluene and residual 4-bromo-1-chlorobutane were distilled away under reduced pressure to obtain the objective substance 4-chlorobutylstyrene.

Synthesis of 4-Chlorobutylstyrene Crosslinked Copolymer 500 ml of desalted water, 2 g of polyvinyl alcohol and 40 g of anhydrous sodium sulfate were supplied into a 500 ml flask equipped with a nitrogen gas introducing tube and a condenser, and nitrogen gas was introduced into the flask to remove oxygen present in the solution. Meanwhile, 30 ml of 2-ethylhexyl alcohol and 0.5 g of AIBN were added to a mixture of 25.8 ml of 4-chlorobutylstyrene and 4.2 ml of divinylbenzene (purity: 55 weight %) to prepare a monomer solution, and oxygen existing therein was removed in the same way as described above.

The monomer solution was put into the said flask and stirred at 150 rpm to prepare a suspension. The suspension was stirred at room temperature for 30 minutes, then heated to 70° C. and stirred for 6 hours, and further stirred at 100° C. for 2 hours to carry out suspension polymerization. The obtained polymer was taken out, washed three times with hot water and then immersed in methanol for a day. The resulting product was filtered out, air-dried and further dried in vacuo at 40° C. for 24 hours. The initial degree of crosslinking of the produced polymer was 10 mol %.

Introduction of Chelate-forming Functional Group into Crosslinked Copolymer 2.25 g of $AlCl_3$ and 5 ml of $PCl_3$ were supplied into a 300 ml flask equipped with a stirrer and a condenser and reacted under reflux at 80° C. for 24 hours. After the end of the reaction, the reaction mixture was poured into an ice-water bath to decompose the unreacted materials to obtain a phosphonic acid type chelate resin. The obtained chelate resin was immersed overnight in a 2N NaOH solution and then the solution was substituted with a 1N HCl solution several times. The product was washed with desalted water until the washings became neutral, and then air-dried. Thereafter, phosphorus content and cation exchange capacity were determined by the methods described below. The results are shown in Table 4. The vacuum-dried chelate resin was used for the determinations.

Determination of Phosphorus Content 0.05 g of the chelate resin was supplied into a Kjeldahl flask, then 5 ml of concentrated nitric acid was added and the mixture was heated slowly until the brown vapor turned white with caution so as not to cause bumping, and then allowed to cool. Thereafter, 5 ml of 60° C. perchloric acid was added and the mixture was heated over low or medium heat until the resin was decomposed. After additional 2- to 3-hour heating and succeeding cooling, the solution in the flask was transferred into a graduated flask and diluted to the mark with desalted water.

5 ml of this solution was put into a 50 ml graduated flask, one drop of phenolphthalein was added thereto and then 5 ml of a dilute ammonia solution was added until the mixed solution assumed a slight crimson color. Thereafter, a 5N nitric acid solution, 5 ml of a 0.25 wt % ammonium metavanadate solution and 5 ml of a 5 wt % ammonium molybdenate solution were added successively and the mixed solution was diluted to the mark with desalted water.

Absorbance at 440 nm of the obtained solution was measured by a visible ultraviolet spectrophotometer, and by using the calibration curves similarly prepared from a 1,000 ppm phosphorus standard solution, the phosphorus content was calculated from the following equation.

$$\text{Phosphorus content (wt \%)} = A \times B \times C \times 100$$

A: phosphorus content (mg) in the measuring solution determined from the calibration curves B: total amount (ml) of the specimen solution/amount (ml) of the specimen solution used for colorimetry C: 0.001/amount (g) of the resin used for the measurement

Determination of Cation Exchange Capacity 150 ml of 0.1N-NaOH-1M-NaCl was added to 0.25 g of the H type resin and shaken at 30° C. for 48 hours. After shaking, the amount of NaOH in the supernatant was measured by neutralization titration with a 0.1N HCl solution of the known factor, and the ion exchange capacity was calculated from the following equation. Methyl orange was used as indicator.

Cation exchange capacity (meq/g)=$0.1 \times f \times (B-A) \times (V/v) \times (1/w)$ A: titer (ml) of the 0.1N HCl solution required for neutralization of the specimen B: titer (ml) of the 0.1N HCl solution required for the blank test f: factor of the 0.1N HCl solution V: total amount (ml) of the specimen solution v: amount (ml) of the specimen solution used for the titration W: amount (g) of the resin used for the titration

EXAMPLES 9–11

Phosphonic acid type chelate resins were obtained by conducting the same procedure as defined in Example 8 except that the reagent and the catalyst used for the phosphonation reaction were changed as shown in Table 4, and the phosphorus content and cation exchange capacity of the obtained resins were determined in the same way as described above. The results are shown in Table 4.

TABLE 4

|  | Reagent | Catalyst | Phosphorus content (wt %) | Cation exchange capacity (meq/g) |
| --- | --- | --- | --- | --- |
| Example 8 | $PCl_3$ | $AlCl_3$ | 2.71 | 3.90 |
| Example 9 | $PCl_3$ | $AlBr_3$ | 4.16 | 5.80 |
| Example 10 | $PBr_3$ | $AlCl_3$ | 4.56 | 8.04 |
| Example 11 | $PBr_3$ | $AlBr_3$ | 4.41 | Undetermined |

What is claimed is:

1. A cation exchanger or a chelating agent having at least structural units represented by the following formula (I) and structural units being derived from a crosslinkable monomer containing an unsaturated hydrocarbon group:

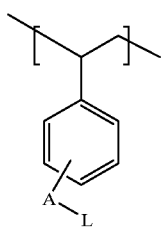

(I)

wherein A represents a $C_4$–$C_9$ alkoxymethylene group; L represents $SO_3^-X^+$, where $X^+$ is a counter ion coordinated with the $SO_3^-$ group, or a chelate-forming functional group; and the benzene ring may be substituted with an alkyl group or a halogen atom.

2. A cation exchanger or a chelating agent according to claim 1, wherein A in the formula (I) is a $C_5$–$C_7$ alkoxymethylene group.

3. A cation exchanger or a chelating agent according to claim 1, wherein the crosslinkable monomer containing an unsaturated hydrocarbon group is divinylbenzene, and the percentage of the structural units represented by the formula (I) is 5 to 99 mol % based on the whole structural units and the percentage of the structural units derived from divinylbenzene is 0.1 to 50 mol % based on the whole structural units.

4. A process for producing a cation exchanger according to claim 1, which comprises suspension-polymerizing at least a precursor monomer having the structural units represented by the following formula (II) and a crosslinkable monomer having an unsaturated hydrocarbon group in the presence of a polymerization initiator, and if necessary, introducing a cation exchange group into the obtained crosslinked polymer:

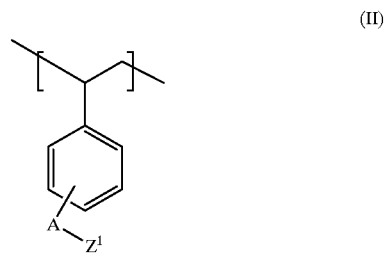

(II)

wherein A has the same meaning as defined in the formula (I); $Z^1$ represents chlorine, bromine, iodine, a hydroxyl group, a tosyl group (toluenesulfonic group), a thiol group or a sulfonic group; and the benzene ring may be substituted with an alkyl group or a halogen atom.

5. A process for producing a chelating agent as defined in claim 1, which comprises suspension-polymerizing at least a precursor monomer having the structural units represented by the following formula (III) and a crosslinkable monomer having an unsaturated hydrocarbon group in the presence of a polymerization initiator, and introducing a chelate-forming functional group into the obtained crosslinked polymer:

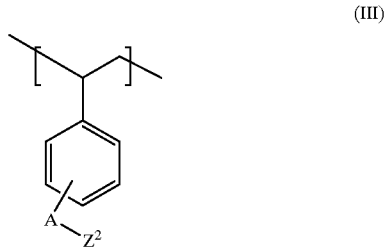

(III)

wherein A has the same meaning as defined in the formula (I); $Z^2$ represents chlorine, bromine, iodine or a hydroxyl group; and the benzene ring may be substituted with an alkyl group or a halogen atom.

* * * * *